United States Patent [19]

Hsien-Jen et al.

[11] Patent Number: 5,799,702
[45] Date of Patent: Sep. 1, 1998

[54] RETRACTABLE CONDUIT

[76] Inventors: Kuo Hsien-Jen; Hsien-Wen Kuo, both of No. 93, Sec. 4, Chin-Hwa Rd., Tainan, Taiwan

[21] Appl. No.: 819,771

[22] Filed: Mar. 18, 1997

[51] Int. Cl.⁶ .................................................. F16L 27/00
[52] U.S. Cl. ........................ 138/120; 138/114; 138/155; 285/227
[58] Field of Search .................. 138/27, 28, 120, 138/114, 110, 113, 155, 111; 137/59, 79; 285/114, 227, 145.4, 145.1

[56] References Cited

U.S. PATENT DOCUMENTS

| | | | |
|---|---|---|---|
| 2,506,293 | 5/1950 | Copeland | 285/227 |
| 3,207,533 | 9/1965 | Van Gundy et al. | 138/114 |
| 3,674,014 | 7/1972 | Tillander | 138/120 |
| 3,813,477 | 5/1974 | Fischer | 138/120 |
| 3,837,685 | 9/1974 | Miller | 138/97 |
| 3,901,539 | 8/1975 | Ijzerman | 138/120 |
| 4,060,263 | 11/1977 | Kotcharian | 138/28 |
| 4,326,503 | 4/1982 | Geier et al. | 138/114 |
| 4,357,860 | 11/1982 | Krzak | 138/120 |
| 4,502,714 | 3/1985 | Brown et al. | 138/149 |
| 4,543,548 | 9/1985 | Seal et al. | 138/120 |
| 5,248,170 | 9/1993 | Francis | 138/120 |
| 5,419,593 | 5/1995 | Greene et al. | 138/114 |

Primary Examiner—Denise L. Ferensic
Assistant Examiner—James F. Hook
Attorney, Agent, or Firm—Rosenberg, Klein & Bilker

[57] ABSTRACT

The present invention provides a retractable conduit, which includes two retaining brackets, two adapters, a sliding pipe, two elastic retainers, two dust covers, bolts and two O-rings. The sliding pipe penetrates through hollow adapter at each end. Bond the adapter to the retaining bracket with an O-ring and bolts. A dust cover is nested on the front of the adapter, an elastic retainer is set in the adapter for fill the gap between the sliding pipe and the interior surface of the adapter. The sliding pipe can be adjusted to an appropriate length or angle due to the motion of earth crust or a great changing of temperature is happened while it is placed underground, also prevents from silt or dust seeping into the pipe, without affect the quality of the stored liquid.

1 Claim, 6 Drawing Sheets

RETRACTABLE CONDUIT

BACKGROUND OF THE INVENTION

(1) Field of the Invention

The present invention relates to a flexible, retractable conduit, and more particularly to a conduit which is retractable as the temperature changing without deformation or cracking.

(2) Description of Prior Art

In accordance with a common underground conduit so far, the high pressure seamless steel tube is employed with inter-butting mostly for transportation. Although this kind of seamless steel tube can be subjected a considerable rated pressure, but it is possible to lead the tube to shrink or extend under a great changes of temperature, and so as to lead the tube deform or crack, because the retractable seam is unavailable in whole conduit. In this case, it would be accompanied with a great cost and time for maintaining and repairing. It is a main sake why this inventor pay great attention and time to solve this problem and reached an achievement on it

OBJECTS AND SUMMARY OF THE INVENTION

It is therefore one object of this invention to provide a new style of shakable and retractable conduit with some characters like elasticity and higher strength, and stainless.

The present invention includes two retaining brackets, two adapters, a sliding pipe, two elastic retainers, two dust covers, several bolts and two O-rings. The sliding pipe is penetrated into the adapters with both ends, and there is an exterior thrust collar fixed nearing each end of the sliding pipe separately for avoiding it sliding off from the adapters. A flange plate is available at the other end of the adapter to connect with the retaining bracket together by bolts. An O-ring is embedded on the interface connecting to the adapter of the flange plate of the retaining bracket. A dust cover is nested on the front portion of each adapter respectively. An elastic retainer is set into the gap between the adapter and the sliding pipe. So when temperature changes in a great difference, the sliding pipe can have an appropriate slippage freely in the elastic retainer. While the motion of earth crust happens, the elastic retainer will follow sliding pipe to subject any swing even deformation, but keep liquid leak free.

DETAILED DESCRIPTION OF PREFERRED EMBODIMENTS

Figure 1:
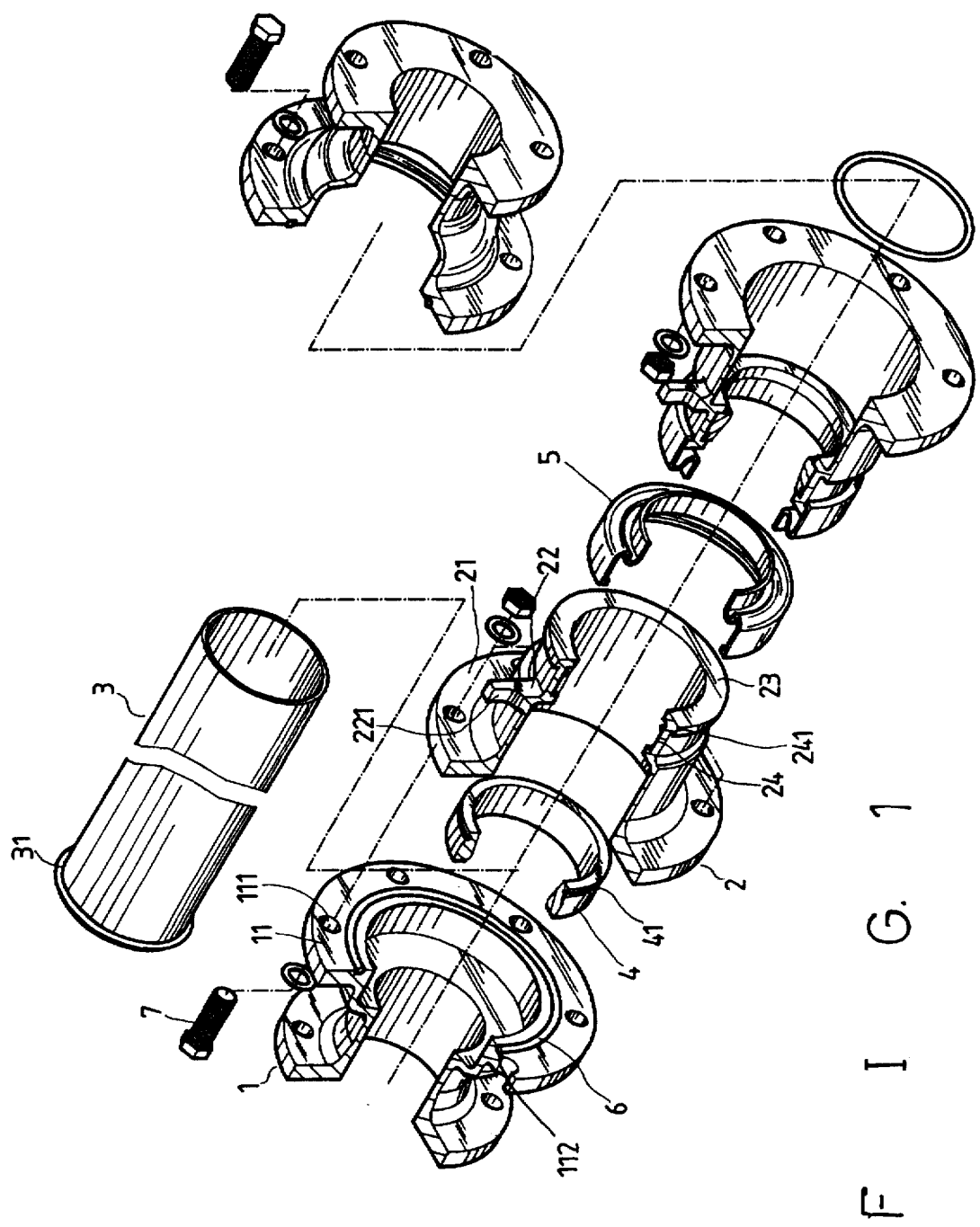
FIG. 1 is an exploded view of the present invention.

Referring to FIG. 1, the present invention includes two retaining brackets (1), two adapters (2), a sliding pipe (3), two elastic retainers (4), two dust covers (5), plural bolts (7) and two O-rings (6).

The retaining bracket (1) is a hollow and pierce through shell having extending a flange plate (11) with several bolt holes (111) at both ends, a circular recess (112) is formed at one of the end face of the flange plate (11).

The adapter (2) is a hollow body extending a flange plate (21) with several holes at one end. Two lugs (22) with a slotted hole (221) are formed oppositely on the exterior surface of the adapter (2). A holding portion (23) with a caulking groove (24) at inner end extends from the other end of the adapter (2), the free end of the holding portion (23) is protected by a dust cover (5). A catching rim (241) is formed on the top wall of the caulking groove (24).

The sliding pipe (3) is a circular pipe having two thrust collars (31) welded on the exterior surface near both ends respectively;

The elastic retainer (4) is a ring, made of colloidal matter, an endless groove (41) formed at the exterior surface.

The dust cover (5) made of colloidal matter is to fit outer diameter of sliding pipe with one end, the another end is formed to a ring back (51) at inside.

Figure 2:
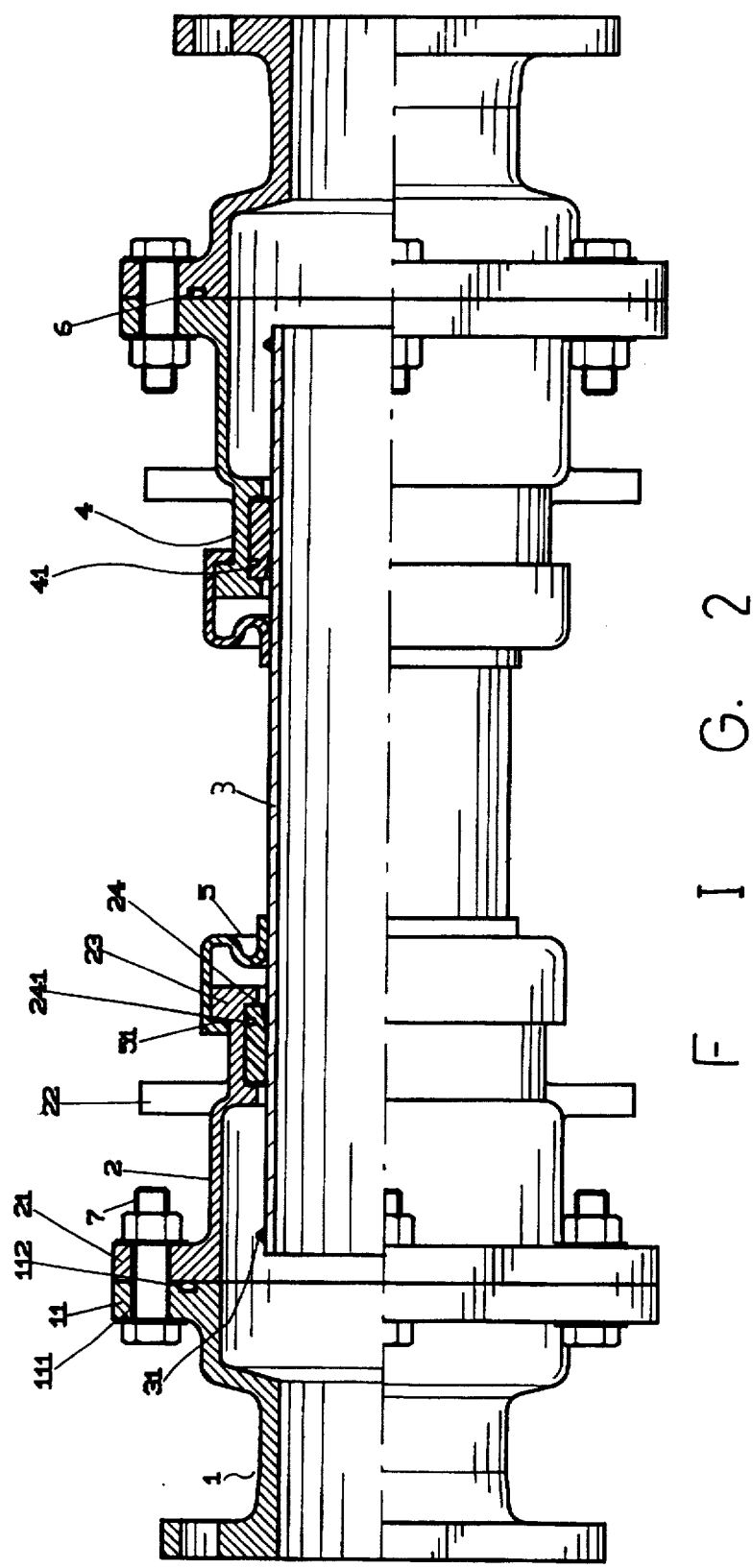
FIG. 2 is a structural profile of the present invention having partially sectioned.
Figure 3:
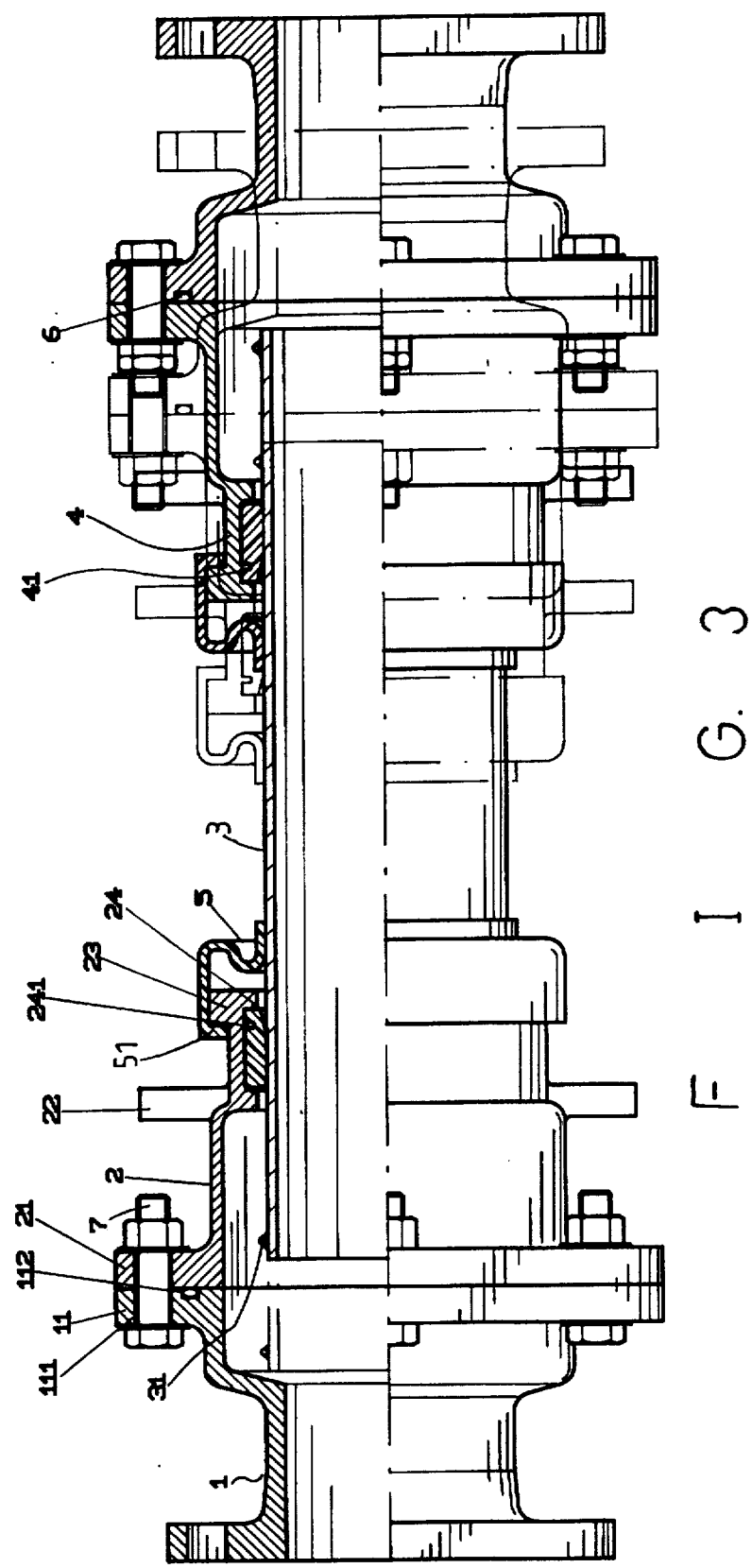
FIG. 3 is an action sketch profile (I) of the present invention.

Referring to FIG. 2, during installation, first let the ring back (51) of the dust cover (5) nest on the holding portion (23) of the adapter (2), then press the elastic retainer (4) into the internal caulking groove (24) of the adapter (2) that enabling the catching rim (241) inserted into the endless groove (41). Weld the thrust collar (31) on the exterior surface at one end of the sliding pipe (3) before installation, then let the sliding pipe (3) penetrate through right the adapter (2) and left adapter (2) respectively. After which, weld another thrust collar (31) on the exterior surface at the other end of the sliding pipe (3) so that the sliding pipe (3) can not slide off from the adapters (2). Then putting an O-ring (6) into the collar recess (112) of the retaining bracket (1), as connecting the two flanges (11) & (21) of the retaining bracket (1) and the adapter (2) together with several bolts (7), due to the diameter of the O-ring (6) is bigger than the diameter of the collar recess (1 12), the O-ring (6) is deformed by the pressure between the two interfaces to seal the inner side to the outer side as a sealer to enhance impervious effect. If earth crust motion or temperature difference is to big, referring to FIG. 3, the sliding pipe (3) will slide a proper length in the adapters (2) in an opposite direction, during the procedure, the elastic retainer (4) persists in sealing the sliding pipe (3) and the adapters (2) so that the objects kept inside of the sliding pipe (3) can not leak out, additionally, due to the ring back (51) of the dust cover (5) always close to the holding portion (23) of the adapter (2), despite sliding pipe is moving or not, the dust cover (5) always close to the sliding pipe (3). When the elongation or shrink reaches a limit, the thrust collar (31) of the sliding pipe (3) will stop at an inner wall of the adapter (2), so as to avoid the sliding pipe (3) sliding off from the adapters (2). So the shakable, retractable conduit of this invention provide an appropriate limited length for pipe to extend or to shrink when temperature have a dgreat change or earth crust have a motion.

Figure 4:
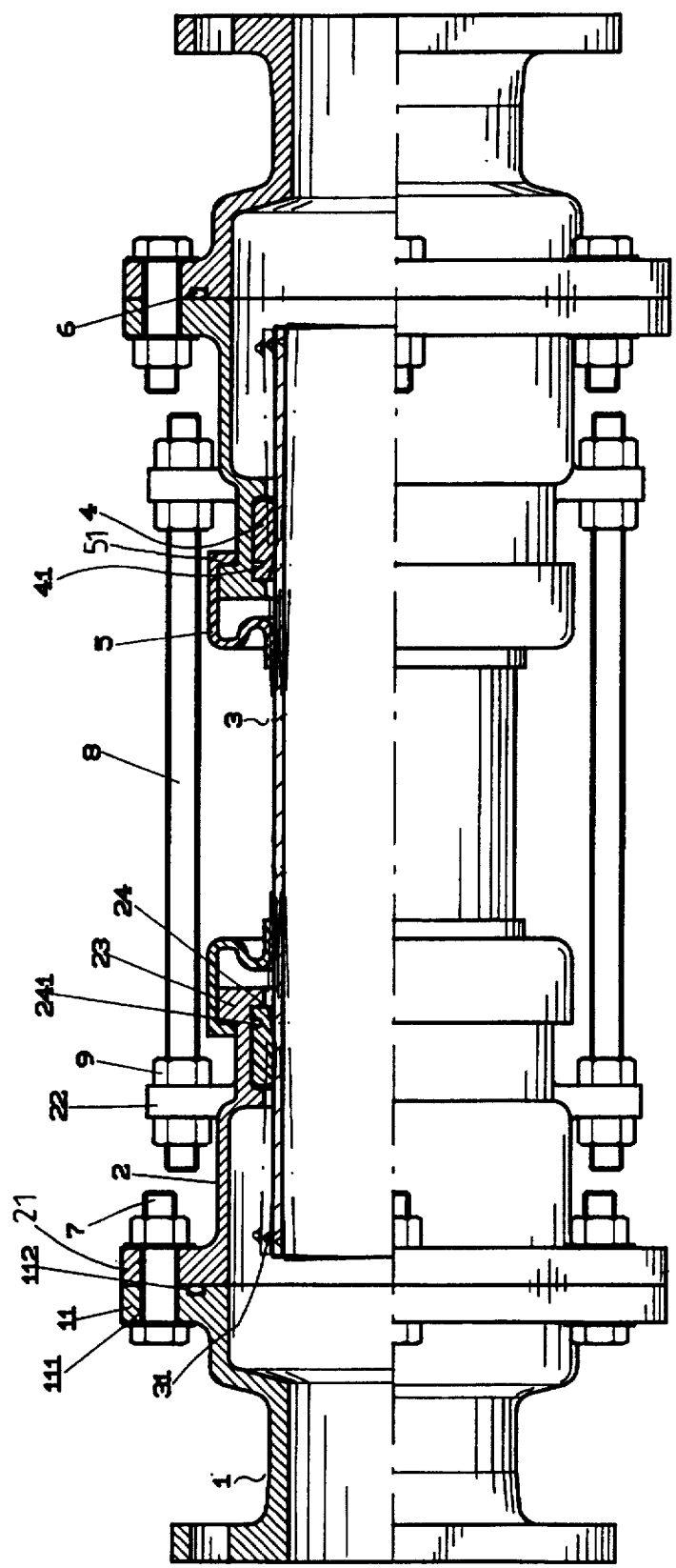
FIG. 4 is an action sketch profile (II) of the present invention.

Referring to FIG. 4, when earth crust have a motion, the mechanism of this invention allows the sliding pipe (3) to bend to an appropriate angle as quake without lead to break.

Figure 5:
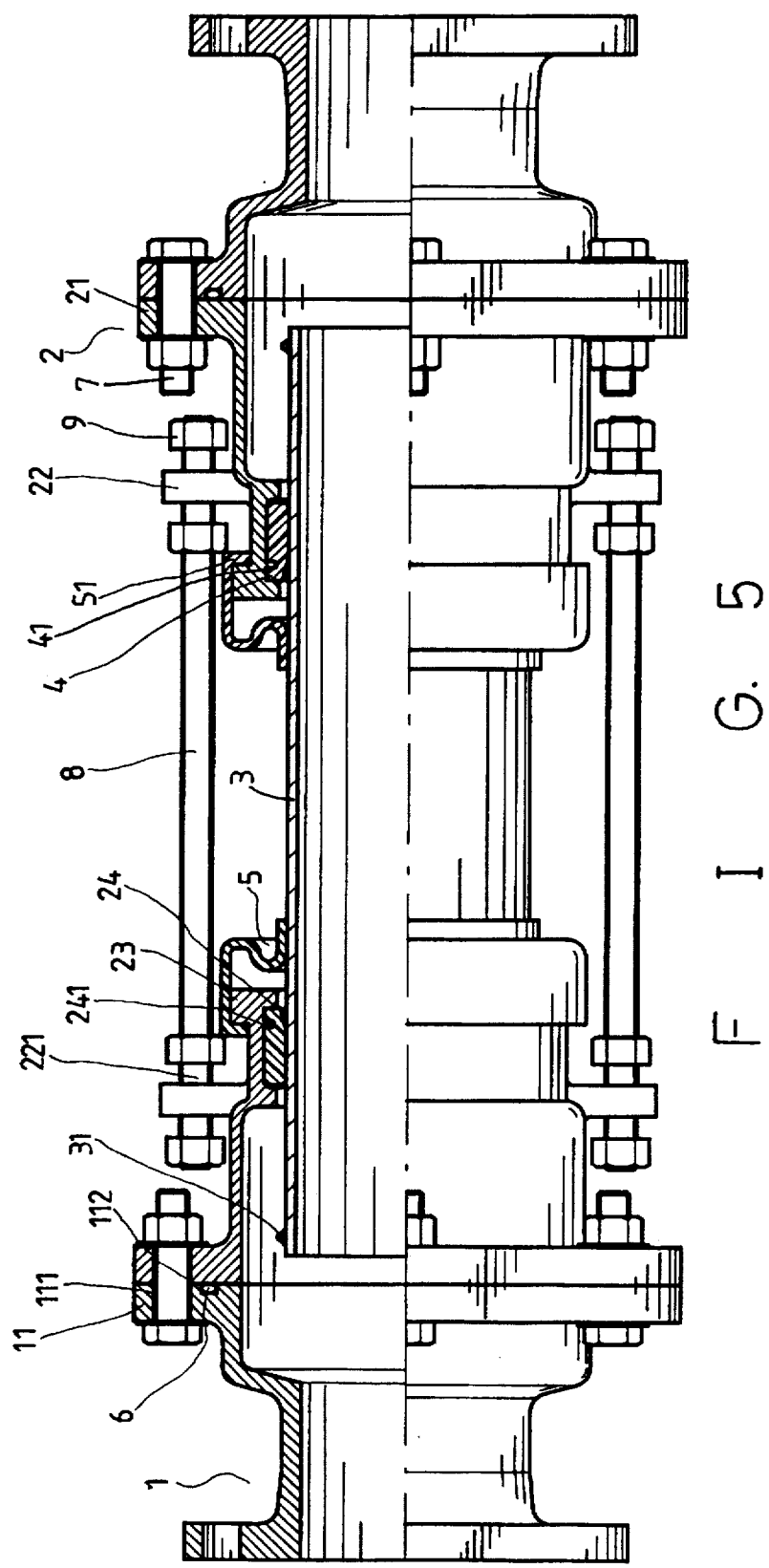
FIG. 5 is a fixed structural profile (I) of the present invention before construction.
Figure 6:
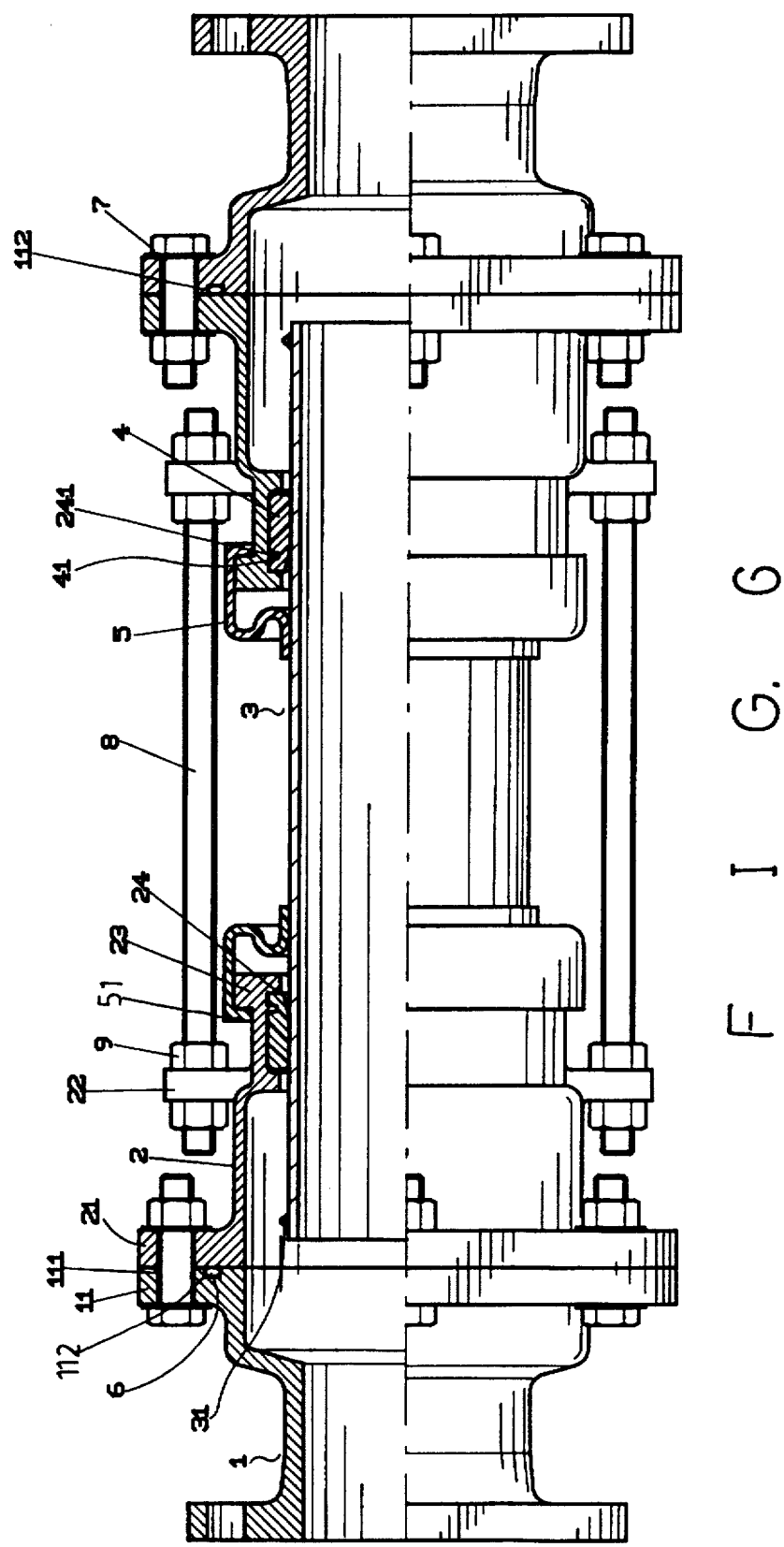
FIG. 6 is a fixed structural profile (II) of the present invention before construction.

In addition, referring to FIG. 5 and FIG. 6, a threaded lifting bolt (8) is inserted through two lugs (22) of the adapters (2) respectively, and fixed on the lugs (22) by the nuts (9) as hoisting and transportation, and they can be removed after transportation.

We claim:

1. A flexible, displaceable conduit, comprising:

a sliding pipe member having a fluid passage extending longitudinally between a pair of opposing ends thereof and a thrust collar coupled to each of said opposing ends;

a pair of adapters, each of said pair of adapters having (a) an annular wall defining a first central through bore through which said sliding pipe member passes, (b) a mounting flange formed on a first end of said annular wall and extending radially therefrom, (c) a holding portion formed on a second end of said annular wall, (d) a first annular groove formed in an inner surface of said annular wall, said first annular groove having a bottom surface and a pair of side walls, one of said pair of side walls defining an integrally formed stopping surface for blocking contact with a respective thrust collar to prevent removal of said sliding pipe member from said adapter through said first central through bore, and (e) a catching rim formed in said bottom surface of said first annular groove and extending therefrom;

a pair of retaining brackets respectively coupled to said pair of adapters, each of said retaining brackets having a second central through bore disposed in fluid communication with said first central through bore of a respective adapter, each of said retaining brackets having a flange plate formed on one end thereof for securement to said mounting flange of a respective adapter;

a pair of elastic retainers respectively disposed between said pair of adapters and said sliding pipe member for providing a fluid seal therebetween, each of said pair of elastic retainers being annularly shaped and positioned in said first annular groove of a respective adapter, each of said pair of elastic retainers being formed of a colloidal material and having a second annular groove formed in an external surface thereof for receiving said catching rim therein; and, a pair of dust covers, each of said pair of dust covers having one end engaged on said holding portion of a respective adapter and an opposing end in contiguous contact with a portion of said sliding pipe member.

* * * * *